INVENTOR.
Robert B. Webb

INVENTOR.
ROBERT B. WEBB
BY
Edward J. Norton
Attorney

United States Patent Office 3,400,325
Patented Sept. 3, 1968

3,400,325
VOLTAGE REGULATOR INCLUDING TRANSIENT REDUCING MEANS
Robert B. Webb, Blackwood, N.J., assignor to Radio Corporation of America, a corporation of Delaware
Filed Jan. 28, 1966, Ser. No. 523,592
9 Claims. (Cl. 323—19)

ABSTRACT OF THE DISCLOSURE

One or more voltage regulators, which may provide different voltages of different polarities are turned on and off by one ramp generator having a terminal of one polarity grounded. A level shift circuit is connected between the ramp generator and those regulators having a terminal of the other polarity grounded. The voltage output of the ramp generator varies the conductivity of each regulator from zero when the regulator is off to a value dependent on the desired output voltage thereof when the regulator is turned on and vice versa. If low output voltages are desired, two regulators are connected in series in such a manner that the output is the difference in their voltages and the output is regulated by the sum of their voltages.

---

Figure 1:
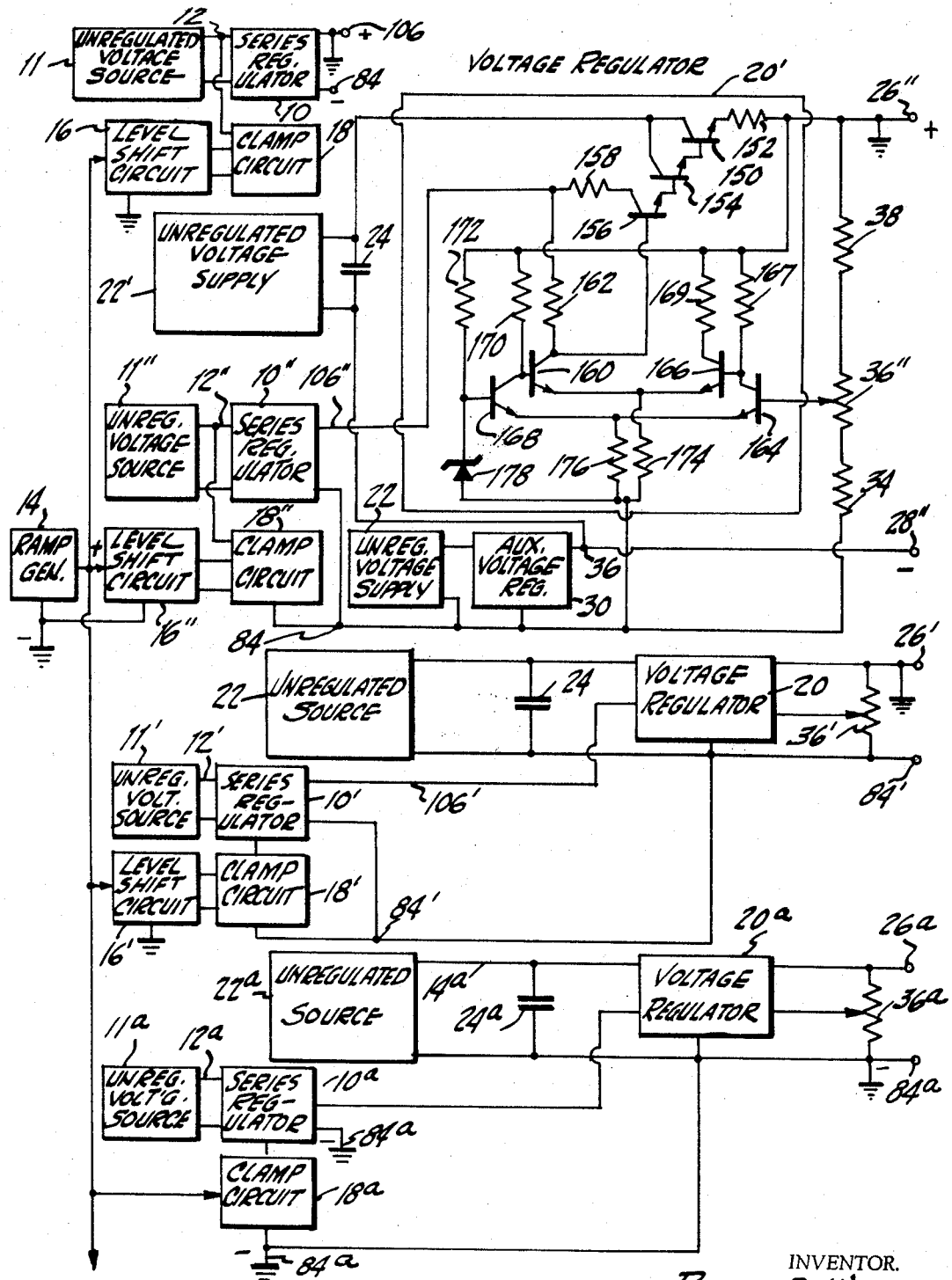

This invention relates to voltage regulators and particularly to an apparatus for reducing transient voltages occurring when one of more voltage regulators are turned on or off. The transients produced by the abrupt turning on or off of prior art voltage regulators can damage or destroy low voltage elements supplied by the voltage regulators.

It is an object of this invention to provide an improved apparatus by which transients occurring when one or more voltage regulators are turned on or off are reduced or eliminated.

It is another object of this invention to provide an improved apparatus by which the voltages supplied by one or more voltage regulators are made to increase from zero when they are turned on in a substantially linear manner to their set value during a predetermined length of time whether their set values be positive or negative and to decrease to zero in a linear manner and over a predetermined length of time when the voltage regulators are turned off.

It is a further object of this invention to provide an improved apparatus by which the voltages of a plurality of voltage regulators are made to increase from zero when they are turned on in such a manner that the ratio of the instantaneous voltages to the set voltages of the several voltage regulators will be approximately equal at all times while the output voltages of the several regulators are increasing, or are made to decrease while maintaining a similar ratio of instantaneous voltages of the several voltage regulators.

Transient voltages can be greatly reduced or eliminated by causing the voltage provided by one or more voltage regulators to build up from zero when they are turned on to their desired value in a linear manner over a predetermined period of time. Similarly transients may be decreased when the voltage regulators are turned off by causing their voltage output to decay linearly over a predetermined period of time. Applications are known in which it is necessary to supply a load with a plurality of different voltages some of which are positive and some of which are negative with respect to ground. When several different voltages of different potential are provided, it is desirable in reducing transient voltages that the several voltages all start from zero or a maximum at substantially the same time and arrive at their maximum values or zero at substantially the same time, and furthermore that the several voltages bear the same or nearly the same proportional relationship to their set maximum values as they vary. That is, the ratios of the several voltages to their set values at any instant during the rise or decay thereof from or to zero should not vary from each other to any great degree. A plus or minus five percent difference in these ratios is acceptable for many applications.

In accordance with this invention, an apparatus having a grounded terminal of one polarity supplies a ramp voltage which varies linearly from zero over a short period of time. This voltage is applied to a voltage regulator, which can have a terminal of the opposite polarity grounded, in such a manner as to cause the regulator, when it is turned on to provide a voltage that varies over the said period of time in a linear manner from zero to its predetermined or set value.

Further, in accordance with this invention, this ramp voltage may be applied to a plurality of voltage regulators in such a manner as to cause each of them to provide a voltage when they are turned on that varies over the said period of time in a linear manner from zero to their individual predetermined or set values, which may or may not be different. One or more of these voltage regulators may have their positive terminals grounded and another or others thereof may have their negative terminals grounded.

When it is desired to turn off the regulator or regulators, the ramp voltage is reduced in a linear manner to zero over a predetermined length of time, causing the voltage provided by the regulator or regulators to be reduced to zero in a linear manner and over the last mentioned predetermined length of time, whereby the transients produced when the regulator or regulators are turned off are also eliminated or reduced to a harmless value.

Figure 2:
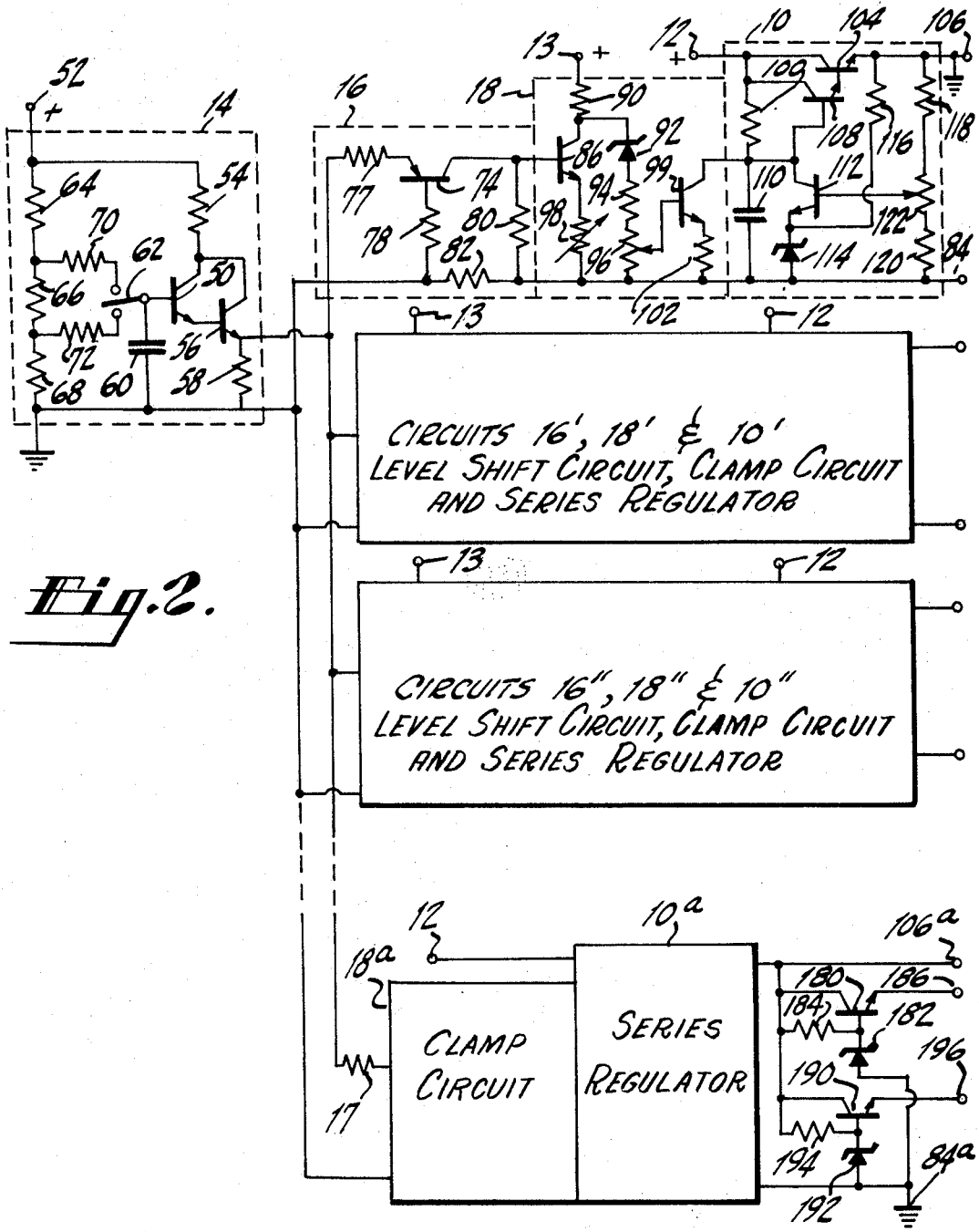

A more detailed description of the invention will now be given in connection with the accompanying drawing in which:

FIGURE 1 is a circuit diagram partially in block form of one embodiment of the invention, and FIGURE 2 is a circuit diagram illustrating in greater detail by way of example certain of the elements shown in FIGURE 1.

Referring first to FIGURE 1, a plurality of similar regulators 10, 10', 10" and 10a respectively supplied by unregulated sources 11, 11', 11", and 11a are provided. These regulators 10, 10', 10" and 10a supply different voltages to their respective loads, and the positive terminals of some of the regulators are grounded while the negative terminals of others thereof are grounded. The output voltage of all the regulators 10, 10', 10" and 10a however are varied between zero and their rated values when they are turned on and off, in a linear manner over predetermined lengths of time by one ramp circuit or generator 14 having its negative terminal grounded, as will be explained.

The series voltage regulator 10 (FIGURE 1) is supplied by an unregulated voltage source 11 having a positive terminal 12. The output voltage from the ramp generator 14, whose negative terminal is grounded, is a ramp voltage which is used to turn the voltage regulators 10, 10', 10" and 10a on and off. The ramp voltage which varies between zero and a positive voltage is applied to a level shift circuit 16. As will be explained, this level shift circuit 16 makes it possible to control the voltage regulator 10 whose positive output terminal 106 is grounded, by the ramp generator 14 whose negative output terminal is grounded. The output of the shift level circuit 16 is applied to a clamp circuit 18 which may be supplied with operating current from the source 11 or from a regulated source (not shown) as in FIGURE 2. The clamp circuit 18 acts to clamp the output voltage of the series regulator 10 to a predetermined voltage, as will be explained, when the ramp voltage provided by the ramp circuit 14 is zero. The output of the series regulator 10 varies from zero to its maximum value linearly and over the period of time that the ramp voltage provided by the ramp circuit 14 is rising, to minimize transients; that is, the output of the series regulator 10 exhibits a ramp voltage when it is turned on. The turning off action is described hereinbelow.

If the regulator 10 has the current capacity to supply a given load (not shown), the output thereof may be so used. In that case, see the top of FIGURE 1, the output load (not shown) may be connected across the grounded positive terminal 106 and the ungrounded negative terminal 84 of the regulator 10. However, if the load requires a much greater supply, such as hundreds of amperes, the regulated ramp output voltage from the series regulator 10' (FIGURE 1, lower middle) may be used to control a high power regulator 20. This high power regulator 20 is supplied by another unregulated source 22, the positive output terminal 26' of the voltage regulator 20 being grounded. A high frequency suppression capacitor 24 is shown connected across the output terminal of the unregulated source 22. The same ramp voltage source 14 which supplies the level shift circuit 16 also supplies a level shift circuit 16'. The level shift circuit 16' supplies an additional clamp circuit 18' which controls the series regulator 10', which in turn is supplied by an unregulated source 11' to cause the series regulator 10' to provide a ramp output voltage when it is turned on. This ramp output voltage of the series regulator 10' is applied to the high power voltage regulator 20 to cause it to provide a high current ramp output voltage across its output terminals 26' and 84'. This ramp voltage rises from zero in a negative direction, since the positive terminal 26' is grounded, to a value determined by the setting of the slider on a potentiometer 36' which is connected across the terminals 26' and 84'.

If the voltage required by the load is very low, that is lower than about fifty percent greater than the breakdown voltage of the Zener diodes usually used in voltage regulators as voltage standard devices, and if the current required thereby is very high, such as in the hundreds of amperes, two voltage regulators 20' and 30 may be so connected in series that a difference voltage of the desired low voltage appears across the positive terminal 26" of the regulator 20' and the positive terminal 28" of the regulator 30. The positive terminal 28" of the voltage regulator 30 however is negative with respect to ground due to the relative voltage outputs of the regulators 20' and 30. Regulation of the low negative output voltage is provided by connecting three resistors 34, 36" and 38, of which resistor 36" has a sliding tap, in series between the negative terminal of the regulator 30 and the positive grounded terminal of the regular 20' whereby the sum of the voltages of the two regulators 20' and 30 appears across the resistors 34, 36" and 38. The voltage appearing on the tap of the resistor 36" is used to control the voltage output of the regulator 20' as will be explained. Since the voltage output of the regulator 30 is set at a predetermined value, and since the voltage output of the regulator 20' is so controlled that the sum of the voltages appearing across the regulators 20' and 30 is maintained constant as the load on the terminals 26" and 28" changes, the voltage across the terminals 26" and 28" is kept constant at the required low value. When so using two regulators 20' and 30, the regulator 30 is turned on first. Since the regulator 20' is off, the voltage provided by the regulator 30 is not applied to the load. When the voltage of the regulator 30 is stabilized at its predetermined value, application of the ramp voltage from the regulator 10" turns on the regulator 20' in a ramp manner, to greatly reduce transients in the load provided by the regulators 20' and 30.

If it be desired to provide many amperes, the voltage of which increases in a ramp manner and in which the negative terminal is grounded, the level shift circuit 16 may be omitted. This is shown at the bottom of FIGURE 1. The output of the ramp circuit 14 is applied directly (or through a decoupling resistor 17 as shown in FIGURE 2) to a clamp circuit 18a whose negative terminal is grounded and whose output is applied to a series regulator 10a whose negative output is also grounded. This series regulator 10a is supplied by an unregulated source 11a. The output of the regulator 10a may be applied to control a high current regulator 20a. A regulated voltage whose negative terminal 84a is grounded appears between the terminals 26a and 84a of the high current regulator 20a. A sample of this output voltage is taken from a resistor 36a which is connected across the terminals 26a and 84a and is applied to the regulator 20a to control its voltage, after the output voltage of the regulator 20a has risen in a ramp-like manner under control of the series regulator 10a. Again, if the output of the series regulator 10a is sufficient to supply its load, the high power regulator 20a and its connections may be omitted and the load may be supplied from across the terminals of the regulator 10a.

Details of the ramp circuit 14, the level shift circuit 16, the clamp circuit 18 and the series regulator 10 are explained by way of example with reference to FIGURE 2. The ramp circuit 14 comprises a NPN transistor 50 whose collector is connected to the positive terminal 52 of a source of potential (not shown) through a resistor 54. The collector and emitter of the transistor 50 are respectively directly connected to the collector and base of a second NPN transistor 56, and the emitter of the transistor 56 is connected to ground through a resistor 58. The base of the transistor 50 is connected to the switch blade of a single pole double throw switch 62 and to ground through a capacitor 60. The terminal 52 is also connected to ground through three resistors 64, 66 and 68 in series, and the two poles of the switch 62 are connected to the terminals of the resistor 66 by respective resistors 70 and 72.

When the switch 62 is closed on its lower terminal as viewed in FIGURE 2 the capacitor 60 charges from the treminal 52 through the resistors 64, 66 and 72 to the threshold value, about one-half volt, of the transistor 50, whereby the transistor 50 is not conductive but is on the threshold of being conductive. When the switch 62 is closed on its upper pole or terminal as shown in FIGURE 2, the condenser 60 charges linearly through the resistors 64 and 70 to the voltage of the junction of the resistors 64 and 66, and a positive going linear ramp voltage with respect to ground appears across the resistor 58. This ramp voltage is applied to the level shift circuit 16. Since all level shift circuits 16, 16' and 16" are similar, only the level shift circuit 16 is described in detail.

The level shift circuit 16 comprises a PNP transistor 74 whose emitter is connected to the emitter of the transistor 56 through a resistor 77. The base of the transistor 74 is connected to ground through a resistor 78. Due to this connection, the voltage appearing across the resistor 58 applied across the emitter and the base of the transistor 74 in the level shift circuit 16. The collector of the transistor 74 is connected to ground through two resistors 80 and 82 in series and to the terminal through the resistor 80. The power supply for the transistor 74 is provided by a voltage drop across the resistor 82 as will be explained. The transistor 74 varies in conduction in phase with the voltage applied thereto from the resistor 58. The resistor 82 prevents grounding of the negative output terminal 84 and therefore permits grounding of the positive terminal 106 of the series regulator 10. The ramp output voltage of the level shift circuit 16, appearing across the resistor 80, is applied to the clamp circuit 18.

The collector of a NPN transistor 86 comprising part of the clamp circuit 18 is connected to the positive terminal 13 of a source of potential through a resistor 90. For optimum results, the source connected to the terminal 13 should be regulated. The collector of the transistor 86 is also connected to the terminal 84 through a normally conductive Zener diode 92 and through resistors 94 and 96 in series. The emitter of the transistor 86 is connected to the terminal 84 through a variable resistor 98. The base of the transistor 86 is directly connected to the collector of the transistor 74. Therefore, the ramp voltage appearing across the resistor 80 is applied between the base and the emitter of the transistor 86. As the transistor 86 is made more conductive as the ramp voltage applied thereto increases in a positive direction, the voltage on the collector of the transistor 86 goes in a more negative direction. Since the Zener diode 92 is normally conductive, whereby the drop provided thereby is independent of the flow of current therethrough, the voltage across the resistor 96 varies in phase with the voltage developed at the collector of the transistor 86. A connection to a slider on the resistor 86 causes a predetermined portion of the voltage appearing across the resistor 96 to be applied to the base of a transistor 99. The collector of the transistor 99 is connected to the terminal 12 of an unregulated voltage source as shown in FIGURE 1 through a resistor 100 and its emitter is connected to the terminal 84 through a resistor 102. The transistor 99 and its connections act like a clamp circuit, that is, the transistor 99 is normally conductive and when conductive it clamps the potential of the bases of the series regulating transistors 104 and 108 of the series regulator 10 to the potential of the terminal 84 whereby the transistors 104 and 108 are non-conductive and no output appears across the terminals 106 and 84 before the ramp voltage starts.

The positive terminal 12 of the unregulated source 11 is connected to the collector of the NPN transistor 104 comprising part of the series regulator 10. The emitter of the transistor 104 is connected to the positive output terminal 106 of the series regulator 10. The collector and emitter of a further transistor 108 are respectively connected to the collector and base of the transistor 104. The base of the transistor 108 is connected to the terminal 84 through a capacitor 110 (which suppresses any high frequency or spike voltages that may be applied thereto in the operation of the described circuit), and to the collector of a transistor 112 whose emitter is connected to the terminal 84 through a Zener diode 114. The emitter of the transistor 112 is also connected to the terminal 106 through a resistor 116. Two resistors 118 and 120 and an intervening potentiometer 122 are series connected across the terminals 106 and 84, and the base of the transistor 112 is connected to the slider of the potentiometer 122. In the absence of the transistor 99 and its connection to the junction of the resistor 100 and the condenser 110, the voltage between terminals 106 and 84 is kept constant, though the voltage of the source to be connected to the terminal 12 may vary, at a value determined by the position of the slider on the potentiometer 122 by varying the conductivity of the series regulating transistors 104 and 108 in a known manner. However, in the absence of the transistor 99 and its connections, the voltage at the terminal 84 would go up so suddenly to its set value as to cause transients in its load when the regulator 10 is turned on. As the ramp voltage applied to the base of the transistor 99 falls in response to the rising voltages on the base of transistor 86, the transistor 99 becomes less conductive and the voltage applied across the terminals 84 and 106 goes up in a ramp-like manner to its set maximum value. The current appearing at the terminals 106 and 84 may supply a load directly or they may supply a ramp voltage to another regulator 20, 20' or 20a (FIGURE 1), as will be explained.

Except for the grounding thereof, the circuits and operation of the regulators 10, 10', 10" and 10a are the same. Except for the grounding thereof the circuits and the operation of the clamp circuits 18, 18', 18" and 18a are also the same. A regulator and the clamp circuit connected thereto have terminals of the same polarity grounded.

The voltage regulator 20' (see FIGURE 1), may be a conventional one for supplying several hundred amperes to its load connected across its terminals 26" and 28". However, it is explained in detail to make clear the connection thereto of the ramp circuit provided by the series regulator 10". This voltage regulator 20' comprises a NPN transistor 150 having its collector connected to one terminal of an unregulated source 22'. The emitter of the transistor 150 is connected to the grounded positive output terminal 26" through a resistor 152. A NPN transistor 154 has its collector connected to the collector of the transistor 150 and its emitter connected to the base thereof. A third NPN transistor 156 has its emitter connected to the base of the transistor 154 and its collector connected through a resistor 158 to a terminal 106" of the regulator 10". The collector of the transistor 156 is also connected to the collector of a transistor 160 through the resistor 158 and a resistor 162 in series. The base of the transistor 156 is connected directly to the collector of the transistor 160. The terminal 26" is also connected to the collectors of three transistors 164, 166 and 168 through respective resistors 167, 169 and 170. The terminal 26" is further connected to the base of the transistor 168 through a resistor 172. The collector of the transistor 164 is also connected to the base of the transistor 166 and the emitter of the transistor 164 is connected to the emitter of the transistor 168, and to the terminal 84 through a resistor 176. The base of the transistor 164 is connected to the wiper on the resistor 36". The emitter of the transistor 166 is connected to the emitter of the transistor 160 and also to the terminal 84 through a resistor 174. The base of the transistor 168 is connected through a Zener diode 178 to the terminal 84. With a fixed voltage on the terminal 106" that is sufficient to permit normal operation of the transistor 156, the voltage between the wiper on the potentiometer 36" and the terminal 84 is compared with the standard voltage appearing across the Zener diode 178 and a difference voltage is applied to the transistors 150 and 154 to control the conductivity thereof to keep the voltage between the terminals 26" and 84 constant at a voltage determined by the position of the wiper on the potentiometer 36". Since this action of the regulator 20' is well known, no further explanation of this portion of the circuit appears necessary. Since the auxiliary regulator 30 produces a constant voltage, a constant difference voltage appears across the terminals 26" and 28". Upon application by the series regulator 10", of a ramp voltage at terminal 84 to a regulated maximum at the collector of the transistor 156, the conductivity of the transistor 156 is raised from zero at the beginning of the ramp voltage appearing between the terminals 106" and 84 to an amount determined by the voltage on the base of the transistor 164, in a linear manner and over a length of time equal to the duration of the ramp voltage.

As noted above, the voltage across the resistor 82 provides power for the level shift circuit 16 as follows: When low output voltage is required and the auxiliary voltage regulator 30 is therefore provided, voltage for operation of the transistor 74 (FIGURE 2) in the shift circuit 16" is developed across the resistor 82 by the normally-on regulator 30 by current flow therefrom to terminal 84, thence through resistor 82 to ground. However, when higher output voltage is required whereby no auxiliary regulator 30 is necessary, as shown in FIGURE 1 by the regulator 20 supplying terminals 26' and 84', the power supply for the transistor 74 comprising part of the level shift circuit 16' is provided as follows: The terminal 84 (FIGURE 2) will be at zero or ground potential at the beginning of the ramp. When the switch 62 is connected to its upper terminal, the ramp voltage output of the ramp circuit 14 begins. A small voltage is developed across the resistor 58. A small current flows through the transistor 74 and the resistors 80 and 82 which is proportional to the voltage across the resistor 58. The voltage appearing across the resistor 80 is supplied to the transistor 86 which causes a small current change in the transistor 99 and also causes a small voltage change at the base of the transistors 104 and 108 which allows the regulator 10′ of FIGURE 1 to become slightly conductive causing a voltage to appear between the terminals 106′ and 84′. Since the terminal 106′ is grounded, this increased voltage is applied across the resistor 82 and by regenerative or bootstrap action, the voltage at 84′ rises with respect to the grounded positive terminal 106′ in a linear manner to its maximum value as determined by the setting of the position of the slider on the potentiometer 36′. This method of operation also obtains in level shift circuit 16.

As shown in FIGURE 2, if it is desired to provide several output voltages by one series regulator 10a, a plurality of transistors 180 and 190 are provided. Each transistor has its collector connected to the output terminal 106a of the regulator 10a, and each transistor 180 and 190 has its emitter connected to a respective output terminal 186 or 196. The base of the transistor 180 is connected to the terminal 84a, by way of a Zener diode 182, and the base of the transistor 180 is connected to the terminal 106a by means of a resistor 184. Similarly, the base of the transistor 190 is connected to the terminal 84a by way of the Zener diode 192 and the base and the collector of the transistor 190 are connected together by a resistor 194. Then, the voltages at the terminals 186 and 196 depend on the breakdown voltages of the Zener diodes 182 and 192 respectively and the maximum current that may be provided at these terminals is determined by the current carrying capacity of the respective transistors 180 and 190.

All the regulators are turned on by connecting the switch blade 62 in the ramp circuit 14 to its upper terminal. When it is desired to turn the several regulators off, the switch blade 62 is moved into contact with the terminal of the resistor 72. The condenser 60 then discharges through the resistors 68 and 72, in a linear manner, to the voltage developed across the resistor 68. The decreasing ramp voltage developed across the resistor 58 is applied, by means of the transistors 74 and 86 and their connections, in a linear, voltage increasing manner between the base and emitter of the clamping transistor 99 to make it more conductive whereby the transistor 99 clamps the base of the transistor 108 to the potential of the terminal 84. The conductivity of the transistors 104 and 108 are thereby reduced linearly whereby voltage across the output terminals 84 and 106 is reduced to zero linearly and during the existence of the decreasing ramp voltage. Since in the embodiment shown at the bottom of FIGURE 1 the grounded terminal of the ramp circuit 14 and the regulator 10a is of the same polarity, no level shift is provided between the ramp circuit 14 and the regulator 10a, however, the regulator 10a is turned off in a similar manner. Turning off of the regulators 10′ and 10″ causes the turning off of the regulators 20 and 20′ controlled thereby. Since the regulators 10, 10′, 10″, 10a, 20, 20′ and 20a are all turned off in a linear manner over a predetermined length of time, the transients produced thereby during turnoff are eliminated or greatly reduced.

Since many modifications of the described invention are possible, this description is to be considered as illustrative and not in a limiting manner.

What is claimed is:

1. Apparatus for preventing or reducing the production of voltage transients in a load upon turning a voltage regulator supplying said load on or off, said voltage regulator having a terminal of one polarity connected to a point of reference voltage, said apparatus comprising means to provide a ramp voltage varying linearly between one value and another value over predetermined periods of time, said ramp voltage means having a terminal of the opposite polarity connected to said point of reference voltage, a level shift circuit having input and output terminals, said output terminals each being connected to said point of reference potential through resistance means, means for applying the output of said ramp circuit voltage means to the input terminals of said level shift circuit, and means to vary the voltage output of said voltage regulator between a low value and a higher value in response to the ramp voltage appearing at the output terminals of said level shift circuit and over said predetermined period of time.

2. Apparatus for preventing or reducing the production of voltage transients in a load or loads upon turning a plurality of voltage regulators supplying said load or loads on or off comprising means to provide a ramp voltage varying linearly between a lower and a higher value over a predetermined period of time, and means to vary the voltage output of said voltage regulators substantially simultaneously between an on value and an off value in response to variation of said ramp voltage over said predetermined period of time.

3. Apparatus for preventing or reducing the production of voltage transients in a load or loads upon turning a plurality of voltage regulators supplying said load or loads on or off, said voltage regulators supplying different voltage outputs, certain of said voltage regulators providing different polarities of output voltage with respect to a reference voltage than other voltage regulators, comprising means to provide a ramp voltage of one polarity varying in a linear manner in potential between a first voltage and a second voltage over a predetermined period of time, and means to vary the voltages of each of said voltage regulators substantially simultaneously between said reference voltage and a voltage remote from said reference voltage and over said predetermined period of time in response to said ramp voltage.

4. The invention as expressed in claim 3 in which said means to provide a ramp voltage has an output terminal of one polarity connected to a point of reference voltage, one of said voltage regulators having an output terminal of said one polarity connected to said point of reference voltage, another of said voltage regulators having an output terminal of opposite polarity to said one polarity connected to said point of reference voltage, and said means to vary the voltage of said other voltage regulator including a level shift circuit.

5. The invention as expressed in claim 4 in which the output of said ramp voltage means is applied to the input of said level shift circuit and in which the output of said level shift circuit is applied to said other voltage regulator, and a point on said input of said level shift circuit is connected to said reference point and a plurality of points on the output of said level shift circuit is connected to said reference point through resistance means.

6. The invention as expressed in claim 3 in which at least one additional regulator is provided, and in which means are provided to apply the output of one of said regulators to which a ramp voltage is applied to the said additional regulator to cause the voltage of the output thereof to change in a linear manner during the existence of said ramp voltage.

7. The invention as expressed in claim 3 in which at least two additional voltage regulators are provided, said voltage regulators being so connected between a pair of output terminals that a voltage substantially equal to the difference in the voltage output of the two voltage regulators appears across said pair of output terminals, and in which means are provided to apply the output of one of said regulators to which a ramp voltage is applied to one of said additional regulators to cause the voltage of the output thereof to change in a linear manner during the existence of said ramp voltage.

8. Apparatus for preventing or reducing the production of voltage transients in at least two load circuits upon turning respective voltage regulators supplying said load circuits on or off, one of said voltage regulators having a terminal of one polarity connected to a point of reference voltage and the other of said voltage regulators having a terminal of the opposite polarity connected to said point of reference voltage, comprising a ramp circuit having a pair of output terminals and of opposite polarity providing a voltage between said terminals which varies between a minimum and a maximum value in one direction from a reference voltage, an output terminal of said ramp circuit of said one polarity being connected to said point of reference voltage, a level shift circuit having a pair of input terminals respectively connected to the output terminals of said ramp circuit and a pair of output terminals each of which is connected to said point of reference voltage through resistance means, a first clamp circuit having a pair of input terminals coupled to the output terminals of said level shift circuit and a pair of output terminals coupled to said one of said voltage regulators a terminal of which is connected to said point of opposite polarity and in a manner to prevent conduction thereof when the output voltage from said ramp circuit is a minimum, and a second clamp circuit having a pair of input terminals coupled to the output terminals of said ramp circuit and having a pair of output terminals coupled to said other of said voltage regulators in a manner to prevent conduction thereof when the output from said ramp circuit is a minimum.

9. Means for providing a current of regulated low voltage between a pair of output terminals comprising a first and a second high voltage regulator of different output voltages, means to connect said voltage regulators in voltage opposition between said pair of output terminals, and means to regulate the voltage output of one of said voltage regulators in accordance with the sum of the voltage outputs of both of said voltage regulators.

References Cited
UNITED STATES PATENTS

| | | |
|---|---|---|
| 3,185,856 | 5/1965 | Harrison. |
| 3,240,997 | 3/1966 | Burgi et al. _____ 323—9 X |
| 3,261,980 | 7/1966 | McCartney et al. ____ 323—9 X |
| 3,273,043 | 9/1966 | Clarke et al. |

LEE T. HIX, *Primary Examiner.*

A. D. PELLINEN, *Assistant Examiner.*